Feb. 4, 1936.  W. R. HICKLER  2,029,371
ARTICLE OF FOOTWEAR AND METHOD OF PRODUCING SAME
Filed June 27, 1934
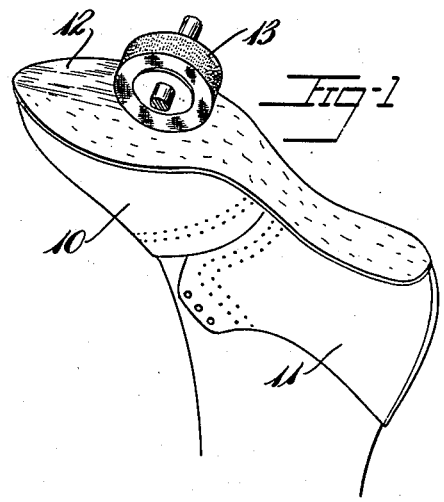
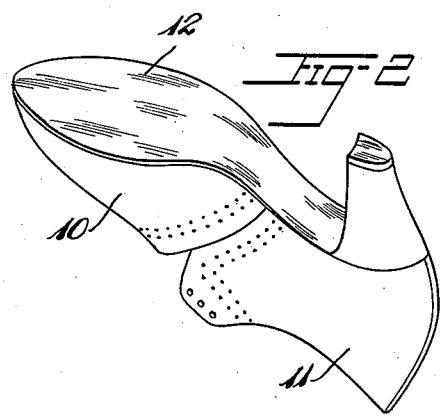
Inventor
Walter R. Hickler
By Eakin & Avery
Attys.

Patented Feb. 4, 1936

2,029,371

UNITED STATES PATENT OFFICE 2,029,371

ARTICLE OF FOOTWEAR AND METHOD OF PRODUCING SAME

Walter R. Hickler, Weston, Mass., assignor to Hood Rubber Company, Inc., Watertown, Mass., a corporation of Delaware Application June 27, 1934, Serial No. 732,651

4 Claims. (Cl. 36—32)

This invention relates to articles of footwear and to methods of producing the same.

The principal objects of the invention are to provide an article having the strength, surface characteristics and appearance of sole leather, which may be applied to a shoe without nailing or sewing, and which may be produced at a reasonable cost.

Other objects will appear from the following description and the accompanying drawing.

Of the drawing:

Fig. 1 is a perspective view of a shoe illustrating one of the steps of finishing the sole.

Fig. 2 is a perspective view of the finished shoe.

Referring to the drawing, the numerals 10 and 11 designate respectively, the vamp and quarters comprising the upper of a lady's shoe. These parts may be made of fabric or rubber and fabric as desired. The sole 12 comprises a vulcanized composition of rubber strengthened and stiffened by fibrous material and pigments incorporated therein.

The sole is made by milling together, on the ordinary roller mill used in the manufacture of rubber compositions, rubber and vulcanizing ingredients such as sulfur accelerators and age resisters, with an amount of fibrous material such as cotton fibers and a reinforcing pigment such as magnesium carbonate, the fibers comprising approximately 20 per cent of the weight of the rubber and the magnesium carbonate comprising substantially 90 per cent of the weight of the rubber. Coloring pigments may also be added.

After the material is thoroughly mixed it may be sheeted on the ordinary rubber calender to the required thickness and shoe soles may be cut therefrom. The soles may be applied to the shoes either before or after vulcanization of the soles as the material may readily be cemented to the upper before or after vulcanization of the sole.

The vulcanized material has the hardness, stiffness, and strength of leather soling due to the fibers and reinforcing pigments contained therein.

In order to provide a surface similar to sole leather, and to smooth the material, which, due to its high fiber content does not calender to a smooth surface, the vulcanized sole is now buffed on its tread surface, whereupon a surface is produced in which the ends of the fibers project beyond the surface of the rubber constituent. Filling material of a waxy nature is now applied to the surface of the sole and the sole is burnished as indicated in Fig. 1. By applying the burnishing wheel 13, the projecting fibers are laid down in one general direction where they are retained by the wax.

The finished article has all of the appearance of a leather sole and its surface characteristics are so nearly like leather that the shoe may be used for dancing without the usual high frictional characteristics of rubber soles being noticed.

I claim:

1. An article of footwear comprising a flexible but inextensible rubber tread member containing a high proportion of fibers, said tread member having on its exposed surfaces a layer of wax through which said fibers extend, said layer of wax and extending fibers being burnished to closely resemble sole leather.

2. An article of rubber composition mixed with fibers, said article having on at least one of its faces exposed projecting fiber ends, and a layer of wax on said surface and filling the interstices between the projecting fibers, said layer having a smooth surface, the fiber ends extending along said surface in one direction.

3. The method of producing a rubber article resembling leather which comprises mixing fibers and rubber to form a vulcanizable composition, vulcanizing the composition, buffing a surface of the resulting article to depress the rubber below the ends of the fibers, filling the interstices between the projecting fibers with a wax, and burnishing the resulting surface to lay the fibers along the surface.

4. A shoe part comprising a vulcanized article of rubber containing magnesium carbonate equal to 90 per cent of the weight of rubber present and cotton fibers equal to 20 per cent of the rubber present, said article having a surface layer of wax, fibers extending from the body of the article through said wax layer and terminating in ends directed along the surface of the wax in one direction.

WALTER R. HICKLER.